United States Patent [19]
Grasselli et al.

[11] 3,893,951
[45] July 8, 1975

[54] CATALYSTS FOR OXIDATION REACTIONS

[75] Inventors: Robert K. Grasselli, Chagrin Falls; Dev D. Suresh, Warrensville Hts., both of Ohio

[73] Assignee: Standard Oil Company, Cleveland, Ohio

[22] Filed: Sept. 25, 1973

[21] Appl. No.: 400,468

Related U.S. Application Data

[63] Continuation-in-part of Ser. No. 228,375, Feb. 22, 1973, Pat. No. 3,840,595.

[52] U.S. Cl. ............... 252/468; 252/469; 252/470
[51] Int. Cl. ..................... B01j 11/06; B01j 11/22
[58] Field of Search ................... 252/468, 469, 470

[56] References Cited
UNITED STATES PATENTS

| | | | |
|---|---|---|---|
| 3,567,772 | 3/1971 | Yanagita et al. | 260/530 N |
| 3,775,474 | 11/1973 | Ohara et al. | 252/469 X |
| 3,786,000 | 1/1974 | Ono et al. | 252/470 X |

*Primary Examiner*—Winston A. Douglas
*Assistant Examiner*—W. J. Shine
*Attorney, Agent, or Firm*—Herbert D. Knudsen

[57] ABSTRACT

The present invention is catalysts that contain oxides or oxide complexes of at least tin, tungsten, vanadium and molybdenum. Optionally, the catalysts may also contain the oxides of iron, nickel, cobalt, zinc, manganese, magnesium or copper. These catalysts are very useful for the oxidation of acrolein to acrylic acid, the oxidation of butadiene to maleic anhydride and other oxidation reactions.

7 Claims, No Drawings

CATALYSTS FOR OXIDATION REACTIONS

CROSS REFERENCE TO RELATED APPLICATION

The present application is a continuation-in-part of our prior application Ser. No. 228,375 filed Feb. 22, 1973 now U.S. Pat. No. 3,840,595.

BACKGROUND OF THE INVENTION

U.S. Pat. No. 3,567,773 shows catalysts containing the oxides or oxide complexes of tungsten, vanadium and molybdenum. These catalysts are useful for oxidation reaction. Essentially, the present invention is the discovery that the addition of tin alone or tin plus a number of optional elements gives a significantly improved catalyst.

SUMMARY OF THE INVENTION

The present invention is the discovery of new catalyst compositions consisting of oxides or oxide complexes that contain catalytically significant amounts of tin, tungsten, vanadium and molybdenum plus optionally one or more of iron, nickel, cobalt, zinc, manganese, magnesium or copper. These catalysts are especially useful for oxidative reactions, such as the oxidation of acrolein to acrylic acid, the oxidation of butadiene to maleic anhydride, the oxidation esterification of acrolein to alkylacrylates and the oxidation of o-xylene to phthalic anhydride.

The central aspect of the present invention is the presence of the four essential elements--tin, tungsten, vanadium and molybdenum--in the catalyst in catalytically significant amounts. These elements are incorporated into the catalyst as the oxides or oxide complexes.

When one of skill in the art knows from this invention that the oxides or oxide complexes of these four are very active catalytically, he is capable of altering the relative ratios of the ingredients to obtain the highly desirable catalysts of the invention. Also, when it is discovered that these catalysts are oxides or oxide complexes useful in oxidation reactions, a literally infinite number of catalyst preparations are immediately known that would prepare suitable catalysts using these four essential elements. Of course, these two points regarding composition and preparation apply as well to those catalysts of the invention that contain the optional ingredients.

Although in the broad concept of the present invention, the catalysts may contain essentially any ratio of the catalytic elements, there are preferred limitations on the catalysts of the present invention. For example, those catalysts wherein more than about 50 percent of the atoms, exclusive of oxygen and any support material, are molybdenum are preferred. Also, those catalysts having atomic ratios described by the empirical formula below are preferred.

$Sn_b W_c V_d Mo_e O_x$ wherein b is a number greater than zero but up to about 12;
c is a number of about 0.1 to about 6;
d is a number of about 0.5 to about 12;
e is a number of about 8 to about 16; and
x is the number of oxygens required to satisfy the valence requirements of the other elements present.

If the optional elements were to be designated by the arbitrary variable $A_a$, i.e. where A is one or more of the optional elements, preferred catalysts are described when a is a positive number such that the catalyst contains at least one of the optional elements. Also, using this designation, catalysts wherein a is greater than zero but less than 6 are preferred. Of greatest interest are those catalysts that contain Fe, Cu, Ni, Mn, Co, Zn or Mg and those catalysts of the empirical formula wherein e is equal to 12 and wherein b is above 0.1.

The catalyst is normally employed in the supported form although the unsupported form also has desirable activity. Suitable support materials include silica, titania, zirconia, alumina, boron phosphate, aluminum phosphate, antimony phosphate, pumice and the like. The use of silica as a support is preferred.

The catalysts of the invention are conveniently prepared in a manner similar to that shown in U.S. Pat. No. 3,567,773 and by the methods exemplified in the Specific Embodiments.

Suitable general methods of preparing the catalyst involve the use of oxides or the soluble salts, such as the ammonium or nitrate salts, of the components of the catalyst. For the addition of tin, tin oxide or a tin salt, such as tin chloride, is suitably used. The optional components of the catalysts are normally added as the nitrates or some other soluble salt.

The ingredients used to make the catalyst can be combined in essentially any manner. Conveniently, the elements are normally combined in water to form an aqueous slurry. The liquid from the slurry is evaporated and the solid is dried.

After this dried catalyst has been prepared, calcination of the catalyst takes place. The calcination normally takes place at a temperature of about 200° to about 700°C. The preferred calcination procedures for the catalysts of the invention vary as different catalyst compositions are utilized.

The catalysts of the invention are substituted for catalysts known to be effective in known reactions. Normally, substantially the same or similar reaction conditions are employed as in the know reaction. The variation is that a different catalyst is used.

For example, the process of making acrylic acid is conducted in a known manner which is essentially the same as that shown in U.S. Pat. No. 3,567,773. Broadly, the reaction is conducted in the vapor phase. The catalyst may be placed in a fixed-bed or fluid-bed reactor. The reactants are passed over the catalyst bed in a mole ratio of about 0.5 to about 4 moles of oxygen per mole of aldehyde and about 1 to about 20 moles of water per mole of aldehyde. The temperature of the reaction is usually maintained between about 200° and about 450°C., with temperatures in the range of about 250° to about 400°C. being preferred. The pressure may vary widely and may range from about 0.5 to about 10 atmospheres.

The preferred reaction in the present invention is the conversion of acrolein to acrylic acid. Of course, other unsaturated aliphatic aldehydes can be converted to the corresponding unsaturated aliphatic acids and other oxidation reactions can be conducted using the catalysts and techniques of the present invention.

SPECIFIC EMBODIMENTS

EXAMPLE 1 -

Preparation of a catalyst containing SnVWMo.

A catalyst having the composition 62% $Sn_6W_{1.2}V_3Mo_{12}O_x$ and 38% $SiO_2$ was prepared by digesting 45.0 g. of $SnO_2$ in 100 c.c. of concentrated $HNO_3$. The supernatant liquid was decanted and the solid was washed with water. In warm water 106 g. of $(NH_4)_6Mo_7O_{24} \cdot 4H_2O$ was dissolved, and this solution was added to a slurry of the tin, 350 g. of 30% weight percent silica sol and 17.6 g of $NH_4VO_3$ in 600 c.c. of water and 16.2 g. of $(NH_4)_6W_7O_{24} \cdot 6H_2O$ suspended in hot water. The pH of the mixture was adjusted to 3 with nitric acid. The mixture was slowly evaporated with stirring and dried in an oven at 130°C. for 24 hours.

COMPARATIVE EXAMPLE A -

Preparation of a catalyst of VWMo.

In a manner shown by U.S. Pat. No. 3,567,773, Example 1, and consistent with the preparations above, catalyst containing 62% $V_3W_{1.2}Mo_{12}O_x$ and 38% $SiO_2$ was prepared, except that the catalyst was dried at 130°C. for 24 hours and calcined in the reactor.

A portion of the catalyst of 20–35 mesh was placed in a 4 c.c. fixed-bed reactor. The reactor was brought to a temperature of 300°C. under a flow of air and maintained at 300°C. for two hours. A feed of 1 acrolein/6 air/5 $H_2O$ was fed through the bed at a rate which gave an apparent contact time of one second. The reactor was run with the feed under the reaction conditions for 15 minutes to precondition the catalyst. After this pre-run, the reactor effluent was collected for 15 minutes. This product was analyzed by gas chromatography. The results of this experiment are shown in Table I.

The catalyst prepared in Example 1 was employed in the manner shown in Comparative Example A. The results of this experiment as compared to the results in Comparative Example A are shown in Table I.

The following definitions are used:

$$\% \text{ conversion} = \frac{\text{amt. of reactant reacted} \times 100}{\text{amt. of reactant fed}}$$

$$\% \text{ selectivity} = \frac{\text{amt. of product formed} \times 100}{\text{amt. of reactant reacted}}$$

$$\% \text{ single pass yield} = \frac{\text{amt. of product formed} \times 100}{\text{amt. of reactant fed}}$$

Table I

Comparison of the Catalysts of the Invention With the Catalyst of the Art

| Example | Catalyst | Reaction Temp.,°C | Conversion,% | Selectivity,% | Single Pass Yield,% |
|---|---|---|---|---|---|
| Comp. A | $W_{1.2}V_3Mo_{12}O_x$ | 300 | 85.4 | 72 | 61.1 |
| 1 | $Sn_6W_{1.2}V_3Mo_{12}O_x$ | 300 | 96.5 | 81 | 78.0 |

It is seen from the examples above that the single pass yield is significantly improved using the catalysts of the invention. In addition, it was observed that the stability of the catalyst is also improved.

COMPARATIVE EXAMPLES B AND C AND EXAMPLES 2-18 -

Preparation of various catalysts of the invention and use of the catalysts to produce acrylic acid.

The catalysts described by empirical formula below were prepared by combining the ingredients noted using the proportions necessary to obtain the ratios specified. The catalysts were prepared according to the following procedure. Ammonium salts of vanadium, molybdenum and tungsten were dissolved in water with heating. The tin was then added to the mixture as the oxide and, when used, copper, iron, manganese and cobalt were added as the nitrate. Finally, a 40 percent ammonia stabilized silica sol was added to obtain a catalyst that contained 62 percent active ingredients and 38 percent silica. The slurry formed was evaporated to a thick paste and dried over night at 110°C. The catalyst was ground and screened, and a 20 × 30 mesh fraction of the catalyst was placed in a 20 c.c. reaction zone of a reactor constructed from a 1.02 c.m. inside diameter stainless steel tube. The catalyst was slowly heated to 400°C. under a flow of air and maintained at 400°C. for 2 hours.

Acrolein was reacted with molecular oxygen to obtain acrylic acid. The active ingredients of the feed composition, reaction conditions and results are shown in Table II.

Table II

Oxidation of Acrolein to Acrylic Acid

| Example | Catalyst Active Ingredients | Feed/Mole of Acrolein Air | Feed/Mole of Acrolein $H_2O$ | Bath Temp.,°C. | C.T., Sec. | Unreacted Acrolein | % Single Pass Yield Acrylic Acid | % Single Pass Yield Acetic Acid |
|---|---|---|---|---|---|---|---|---|
| Comp. B | $W_{1.2}V_3Mo_{12}O_x$ | 10 | 6 | 274 | 2.1 | 0.4 | 80.4 | 6.5 |
| Comp. C | " | " | " | 288 | 1.8 | 0 | 66.4 | 11.4 |
| 2 | $Sn_6W_{1.2}V_3Mo_{12}O_x$ | 10.2 | 6.1 | " | 1.9 | " | 64.0 | 8.4 |
| 3 | " | " | " | 260 | 2.0 | trace | 82.3 | 2.9 |
| 4 | " | " | " | 232 | 2.1 | 12.4 | 77.9 | trace |
| 5 | $Sn_{0.5}W_{1.2}V_3Mo_{12}O_x$ | " | " | 288 | 1.8 | 0 | 59.0 | 6.9 |
| 6 | " | " | " | 260 | 2.0 | trace | 83.1 | 2.2 |
| 7 | $Cu_2Sn_{0.5}W_{1.2}V_3Mo_{12}O_x$ | 10.4 | 6.2 | 260 | 2.0 | 0 | 88.9 | 2.4 |
| 8 | " | " | " | 246 | 2.0 | trace | 92.4 | 2.1 |
| 9 | " | " | " | 232 | 2.1 | 1.9 | 94.6 | trace |
| 10 | $Cu_2Sn_{0.1}W_{1.2}V_3Mo_{12}O_x$ | 10 | 6 | 232 | 2.3 | 1.8 | 92.8 | 0.9 |
| 11 | $Cu_3Sn_{0.5}W_{1.2}V_3Mo_{12}O_x$ | 10.4 | 6.3 | 246 | 2.0 | 0.5 | 91.8 | 1.2 |
| 12 | " | " | " | 232 | 2.1 | 9.6 | 86.6 | trace |
| 13 | $Mn_2Sn_{0.5}W_{1.2}V_3Mo_{12}O_x$ | 10.4 | 6.4 | 246 | 2.1 | 4.5 | 88.7 | trace |
| 14 | " | " | " | 260 | 2.0 | 0 | 89.2 | 2.1 |
| 15 | $Fe_2Sn_{0.5}W_{1.2}V_3Mo_{12}O_x$ | 10.4 | 6.2 | 246 | " | " | 86.9 | 1.5 |
| 16 | " | " | " | 232 | 2.1 | 1.8 | 88.9 | trace |
| 17 | $Co_2Sn_{0.5}W_{1.2}V_3Mo_{12}O_x$ | 10.3 | " | 246 | 2.0 | 0 | 91.4 | " |
| 18 | " | " | " | 232 | 2.1 | 15.9 | 78.5 | 0 |

The term "trace" means less than 0.2

EXAMPLE 19 -

Preparation of catalyst containing CuSnWVMo.

A catalyst having the formula $Cu_2Sn_{0.5}V_3W_{1.2}Mo_{12}O_x$ was prepared as follows by preparing a mixture of 160 parts by weight of water, 81.2 parts $MoO_3$, 12.8 parts $V_2O_5$, 10.35 parts W metal powder and 3.55 parts of $SnO_2$. The mixture was brought to a boil and boiled for two hours. At this point, 18.8 parts of $Cu(C_2H_3O_2)_2 \cdot 2H_2O$ dissolved in 30 parts of water were added to the above mixture, and the mixture was boiled for another 1.5 hours. The mass was cooled to room temperature, the liquid was decanted and the solid was dried at 120°C. for 16 hours. The catalyst was then activated in a stream of air for three hours at 350°C.

EXAMPLE 20 -

Preparation of maleic anhydride.

The catalyst prepared in Example 19 was used in the oxidation of butadiene to maleic anhydride. A reactor having a reaction zone of 5 c.c. was constructed of a stainless steel tube having an inside diameter of 1 c.m. A feed of butadiene/air/steam of 1/30/5 was fed over the catalyst at a temperaure of 280°C. and an apparent contact time of three seconds. Of the butadiene fed, 86.1 percent reacted, the selectivity to maleic anhydride was 72 percent and the single pass yield of maleic anhydride was 61.8 percent.

EXAMPLE 21 -

Oxidative esterification of acrolein.

Using the same reactor and a fresh charge of the catalyst prepared in Example 19, the oxidative esterification of acrolein was conducted. The feed to the reactor was 1 acrolein/1 methanol/6 air/4 steam. The reactor was maintained at 270°C., and the apparent contact time was two seconds. The acrolein was 99.6 percent converted, the single pass yield of methyl acrylate was 29.4 percent and the single pass yield of acrylic acid was 66.3 percent. The selectivity of the reaction to desirable products of methacrylate and acrylic acid was 96 percent.

EXAMPLE 22 -

Preparation of phthalic anhydride.

One c.c. of fresh catalyst prepared in Example 19 was mixed with 4 c.c. of quartz and charged to the reactor of Example 20. A feed of 1 orthoxylene/20 air was fed over the catalyst at a temperature of 345°C. and an apparent contact time of 1.0 seconds. The o-xylene was 40 percent converted, the selectivity ot phthalic anhydride was 77 percent and the single pass yield of phthalic anhydride was 30.8 percent. Using the same feed and conditions except that the temperature was raised to 365°C., the conversion of the o-xylene was 64.5 percent, the selectivity to phthalic anhydride was 55 percent and the single pass yield of phthalic anhydride was 35.5 percent.

In the same manner as shown by the examples above, the catalysts of the present invention are used in other oxidation reactions such as the preparation of methacrylic acid from methacrolein, the preparation of ethylacrylate from acrolein and the like.

Also in the same manner, other catalysts of the invention such as $Fe_6Sn_2WV_6Mo_{18}O_x$, $Mg_2Sn_4W_2V_4Mo_{12}O_x$ and $Ni_6Co_2FeSn_3W_4VMo_{20}O_x$ may be used in oxidation reactions.

We claim:

1. A catalyst composition having the formula:

$A_a \ Sn_b \ W_c \ V_d \ Mo_e \ O_x$ wherein

A is one or more of the elements selected from Fe, Ni, Co, Zn, Mn, Cu and Mg;

and wherein $a$ is 0 to less than about 6;

$b$ is a number greater than zero up to about 12;

$c$ is a number of about 0.1 to about 6;

$d$ is a number of about 0.5 to about 12;

$e$ is a number of about 8 to about 16; and $x$ is the number of oxygens required to satisfy the valence requirements of the other elements present 2. The catalyst of claim 1 wherein a is greater than zero.

3. The catalyst of claim 2 containing Fe.

4. The catalyst of claim 2 containing Co.

5. The catalyst of claim 2 containing Ni.

6. The catalyst of claim 2 containing Mn.

7. The catalyst of claim 2 containing Cu.

* * * * *